Figure 1:
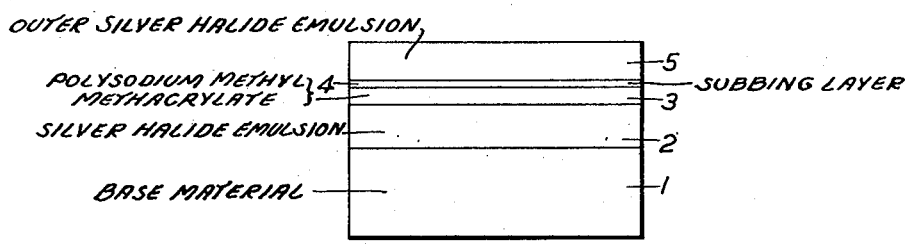

March 25, 1952 J. H. COOTE ET AL 2,590,296
PHOTOGRAPHIC MULTILAYER STRIPPING FILM
Filed Sept. 11, 1948

Inventors
Jack Howard Coote
William Harry Gathercole
By
Wenderoth, Lind & Ponack
Attorneys Patented Mar. 25, 1952

2,590,296

UNITED STATES PATENT OFFICE 2,590,296

PHOTOGRAPHIC MULTILAYER STRIPPING FILM

Jack Howard Coote, London, and William Harry Gathercole, Worcester Park, Surrey, England, assignors to Dufay-Chromex Limited, London, England, a British company Application September 11, 1948, Serial No. 48,928
In Great Britain September 9, 1947

5 Claims. (Cl. 95—2)

This invention relates to multi-layer stripping films and to a process for the production thereof. Such films are required when it is desired to transfer one or more of a plurality of colour records produced by a single exposure to separate bases for use in obtaining the corresponding positive records or for use in the copying process described in British Patent No. 638,308.

For use in cinematographic work it is necessary to secure good adhesion between the several layers as well as good overall flexibility with the minimum thickness of film. It is difficult to secure material fulfilling all these requirements.

Numerous proposals have been made to interpose between silver halide emulsion layers substances of basic or acidic character (usually applied as solutions in organic solvents) and to rely upon the ultimate solution in an aqueous bath of appropriate pH of the basic or acidic substance to permit ready separation of the emulsions. Other proposals have included the application of solutions in organic solvents or even in water of film-forming substances having adhesive properties.

There are substantial disadvantages accruing from coating solutions in organic solvents since appropriate provision has to be made for evaporating the solvents employed and, if possible, for recovering these for re-use. This is obviated if water is the only solvent employed. Photographic film coating plant is designed for use with aqueous solutions and emulsions and consequently no new plant problems are then involved.

We have now found that multi-layer stripping film meeting all the basic requirements which can be accurately controlled and can be applied from aqueous solution or emulsion is obtained when the layer or layers separating the silver halide emulsion layers are copolymers of an alkali metal acrylate and/or methacrylate with an ester of acrylic and/or methacrylic acids. These copolymers can be coated from aqueous solution or emulsion depending upon the requirements for a particular layer.

The present invention provides a multi-layer stripping film comprising a support carrying upon one side thereof at least two silver halide emulsion layers sensitized to different parts of the spectrum and separated by a layer comprising a copolymer of an alkali metal salt of acrylic and/or methacrylic acids and an ester of acrylic and/or methacrylic acids.

The invention also provides a process of preparing a multilayer stripping film which comprises coating a support carrying a first silver halide emulsion layer with a copolymer of an alkali metal salt of acrylic and/or methacrylic acids and an ester of acrylic and/or methacrylic acids thereafter coating with a second silver halide emulsion layer sensitized to a different part of the spectrum from the first emulsion layer.

According to a feature of the invention when there are at least three silver halide emulsion layers carried upon the same side of the support and the copolymer layer separating the outermost emulsion layer from the second layer is a copolymer of the same salt and the same ester as that separating the second and third emulsion layers, the layer separating the outermost and second emulsion layers contains a higher proportion of alkali metal salt than the other copolymer.

The emulsions or dispersions of the copolymers of the alkali metal salts of acrylic and/or methacrylic acids with an ester of acrylic and/or methacrylic acids are obtained by the copolymerization of the alkali metal salt, such as the sodium salt, with the monomeric ester in aqueous dispersion or emulsion in the presence of a catalyst, and preferably at raised temperatures. A dispersing agent is employed: this may be a conventional type of wetting agent such as the sodium salts of sulphated mixed long chain fatty alcohols or may be one of the said copolymers in the production of which a high proportion of alkali metal salt has been employed. The production of these emulsions is disclosed in British Patent Specification No. 648,001.

The emulsions are preferably plasticised. This may be effected by separately emulsifying a suitable plasticiser such as dibutyl phthalate, methyl glycol phthalate, glycerol monolactate diacetate or triethylene glycol dihexoate and thoroughly mixing the emulsions in the desired proportions.

The preferred copolymers employed are those of the sodium or potassium salts of acrylic and/or methacrylic acids with the lower alkyl esters, such as the methyl ester of acrylic and/or methacrylic acids especially the copolymers of sodium methacrylate with methyl methacrylate. The preferred range of copolymers are those obtained when the sodium methacrylate employed constitutes from 10 to 25% by weight of the polymerizing substances.

In carrying out the process of the invention as shown in Figure 1 of the accompanying drawings, the base material 1 carrying a single silver halide emulsion 2 is coated with a thin layer 3 of an aqueous dispersion of polysodium methyl methacrylate containing dispersed plasticiser. The layer is preferably coated sufficiently thin that upon drying the resulting coating is not more than one thousandth of an inch thick and, most desirably, not more than one quarter of that thickness. Uniform application of the copolymer dispersion is extremely important as the outerlying layer containing the developed silver image must be stripped uniformly from the stripping film and this must be accomplished without risk of tearing and without carrying with it any part of the underlying, undeveloped silver halide emulsion. The coating is then treated with a subbing layer 4 which is a dilute aqueous solution of gelatine and chrome alum containing a wetting agent. Thereafter the outerlying silver halide emulsion layer 5 is coated in the usual manner.

It is important that the aqueous dispersion of polysodium methyl methacrylate be free from coarse particles which may be present therein and accordingly the material should be filtered through cotton wool, glass wool or the like before use.

When at least three emulsion layers are to be applied to the same side of the base material, the interposed layers of polysodium methyl methacrylate are preferably derived from emulsions in which the copolymers have been prepared using different proportions of the same sodium salt in the polymerising materials. Those layers which contain a higher proportion of the sodium salt in the copolymer have been found to be capable of stripping more readily. In this case it has been found that the maximum amount of sodium methacrylate in the copolymer used is about 25%. The most useful range is that containing from 10 to 25% of sodium methacrylate in the copolymer. Higher percentages of sodium salt are useful only when a single stripping layer is present and there is no danger of the applied layer dissolving in some subsequently applied solution. Emulsions containing less than 10% of sodium methacrylate in the copolymer, for example 5% can be used. The copolymer emulsions used should possess sufficient adhesion not to strip under 3 or 4 minutes' soaking so as to allow a sufficient safety factor for the development of the outer image and the customary washing steps associated therewith without separation occurring.

In practice it has been found satisfactory to utilise two or three standard emulsions and thoroughly to mix these in desired proportions. It should be realized however that such mixed emulsions are not equivalent in their properties to a directly prepared copolymer containing the same proportions of the respective copolymerizing materials.

With copolymer layers of substantially one four-thousandths of an inch thickness it has been determined that a layer derived from an emulsion containing 90 volumes of a copolymer in which the polymerizing materials were 10 parts by weight of sodium methylate and 90 parts by weight of methyl methylate plus 10 volumes of a copolymer in which the copolymerizing materials were 25 parts by weight of sodium methacrylate and 75 parts by weight of methyl methacrylate will enable satisfactory separation in 1.5 minutes. When the proportions are changed to 95 volumes and 5 volumes of the same emulsions satisfactory stripping is secured after 5 minutes' soaking and when the copolymer is wholly that containing the lower proportion of sodium methacrylate about 11 minutes' soaking is required.

There will now be described the production of a three-colour stripping film in accordance with the invention.

The emulsions used are made by copolymerising sodium methacrylate and methyl methacrylate in aqueous dispersion in the proportions of 10:90 and 25:75 by weight. The emulsions are plasticised and contained substantially 40% of solids. With the coating machine available these emulsions could be coated at such a thickness as to give a dry layer thickness of about one four-thousandths inch. It should be understood, however that with other coating machines the emulsions can be applied at greater dilution and the adjustment is desirably such as to give a dry layer thickness not exceeding one-thousandth inch and preferably about four-thousandths.

Figure 2:
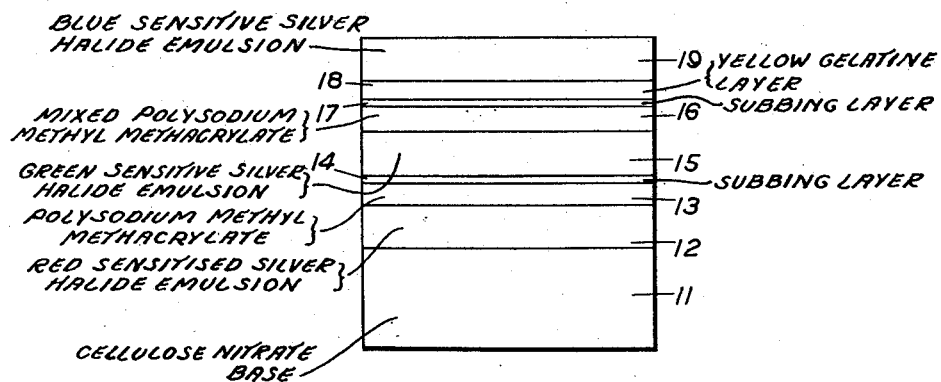

As shown in Fig. 2 of the drawings a cellulose nitrate base 11 carrying a red sensitized silver halide emulsion layer 12 is coated (13) with a 40% aqueous emulsion of plasticised polysodium methyl methacrylate containing 10% of sodium methacrylate and allowed to dry. The surface is then treated (14) with a subbing solution made up from equal volumes of 1% aqueous solutions of chrome alum and gelatine to which has been added a small quantity of a wetting agent. This is then coated with the green sensitive silver halide emulsion layer 15. The emulsion as applied had previously had added to it a small quantity of a wetting agent—about 0.1% by weight based upon the weight of the emulsion has been found to be suitable. The wetting agent is added as it is found to assist the spreading of the emulsion upon the snubbed polysodium methyl methacrylate layer.

The green sensitive silver halide emulsion layer is then coated with the emulsion obtained by mixing 90 volumes of the aforesaid 40% aqueous emulsion of plasticised polysodium methyl methacrylate containing 10% of sodium methacrylate with 10 volumes of a 39% aqueous emulsion of plasticised polysodium methyl methacrylate containing 25% of sodium methacrylate. This mixture is thoroughly homogenized and filtered before use. The mixed emulsion is then coated to produce a dry layer 16 of about one four-thousandths inch thickness. The surface of the dried coating is treated with the same subbing solution as that previously employed (17) and then coated with a layer of gelatine 18, dyed with Chlorazol Brilliant Yellow to serve as a minus blue filter. Finally a blue sensitive silver halide emulsion layer 19 containing a small proportion of wetting agent is coated on the yellow filter layer 18.

There is thus produced a three-colour stripping film in which the properties of the interposed emulsion layers are graduated.

A two-colour stripping film may be made in accordance with this invention as follows:

A cellulose nitrate or cellulose acetate base is first prepared carrying a silver halide emulsion fully sensitized to red and partially sensitized to green light. This may be done in known manner. This silver halide emulsion is then coated with a thin layer of an emulsion obtained by mixing 95 volumes of a 40% aqueous emulsion of plasticised polysodium methyl methacrylate containing 10% by weight of sodium methacrylate with 5 volumes of a 39% aqueous emulsion of plasticised polysodium methyl methacrylate containing 25% of sodium methacrylate. The mixture was thoroughly homogenized and filtered before use. The mixed emulsion is then coated to produce a dry layer about one four-thousandths inch thick. After drying the coating is subbed by applying a solution made up from equal volumes of 1% aqueous solutions of gelatine and chrome alum to which was added a small quantity of a wetting agent. The surface was then coated with a thin layer of gelatine dyed with Congo red, to serve as an orange-red filter and thus effectively absorb blue and green light up to wavelengths of approximately 550µ and transmit the longer visible wavelengths.

On top of the orange-red filter there is coated a silver halide emulsion layer partially sensitized to green i. e. from 400–500µ thereby recording blue and part of the green of the spectrum.

Such a two-colour film is suitable for exposure with the blue-green emulsion facing the lens of the camera. After exposure the latent image can be developed in a conventional black and white developer and, after printing a positive record therefrom using light to which the red and green emulsion is not sensitive, the image-bearing layer can be stripped off after soaking in water for 5 or 6 minutes. It peels off cleanly and leaves the underlying emulsion intact. Development of this emulsion to provide the corresponding colour record negative can then proceed.

No solvents other than water are required in producing these stripping films and the coating is carried out utilizing a conventional coating machine. In the subsequent stripping operations no special chemicals are required to reduce the adhesion between the layers and permit stripping. The outer copolymer layer of the three-layer stripping film has a higher proportion of sodium methacrylate and this enables it to be stripped more readily.

Whilst the invention has been described above with reference to polysodium methyl methacrylate it should be understood that, in like manner, there may be used the other polyalkali metal methyl methacrylates such as polypotassium methyl methacrylates as well as the corresponding acrylates. There may also be used other lower alkyl methacrylates in place of methyl methacrylate, especially those containing not more than six carbon atoms in the alkyl group.

The polymers used in accordance with the present invention fulfil a double function in that not only do they act as the stripping base material but they sufficiently adhere to the underlying silver halide emulsion layer not to require the introduction of a separate material, of adhesive character.

We claim:

1. A multi-layer stripping material comprising a support carrying upon one side thereof three silver halide emulsion layers, each silver halide emulsion layer being separated from the adjoining one by a layer comprising a copolymer of sodium methacrylate and methyl methacrylate the copolymer layer separating the outermost silver halide emulsion layer from the second silver halide emulsion layer containing about 11.5% by weight of sodium methacrylate in the copolymer and the copolymer layer separating the second and third silver halide emulsion layers containing about 10% by weight of sodium methacrylate in the copolymer, the remaining constituent of each copolymer being methyl methacrylate.

2. A photographic stripping film comprising a support having on one side two superposed silver halide emulsion layers separated by a layer comprising a copolymer of an alkali metal salt of an acid having the general formula $$CH_2=CR.COOH$$

where R is selected from the group consisting of hydrogen and methyl and an alkyl ester of one of said acids, said alkali metal salt constituting 5–25% of said copolymer and said alkyl ester 95–75% thereof by weight.

3. A photographic stripping film comprising a support having on one side three superposed silver halide emulsion layers, each emulsion layer being separated from the adjoining one by a layer comprising a copolymer of an alkali metal salt of an acid having the general formula $CH_2=CR.COOH$ where R is selected from the group consisting of hydrogen and methyl and an alkyl ester of one of said acids, the copolymer separating the outermost silver halide emulsion layer from the second silver halide emulsion layer being a copolymer of the same salt and the same ester as the copolymer layer separating the second silver halide emulsion layer from the third silver halide emulsion layer but containing a higher proportion of the alkali metal salt, said salt in both layers constituting 5–25% of said copolymer and said alkyl ester 95–75% thereof by weight.

4. A photographic stripping film comprising a support having upon one side two superposed silver halide emulsion layers separated by a layer comprising a copolymer of an alkali metal methacrylate and methyl methacrylate, said alkali metal methacrylate constituting 5–25% of said copolymer and the methyl methacrylate 95–75% thereof by weight.

5. A photographic stripping film comprising a support carrying upon one side thereof two superposed silver halide emulsion layers sensitized to different parts of the spectrum and separated by a layer comprising a copolymer of sodium methacrylate and methyl methacrylate, the sodium methacrylate constituting 5–25% of said copolymer and the methyl methacrylate 95–5% thereof by weight.

JACK HOWARD COOTE.
WILLIAM HARRY GATHERCOLE.

REFERENCES CITED

The following references are of record in the file of this patent:

UNITED STATES PATENTS

| Number | Name | Date |
|---|---|---|
| 2,182,814 | Marasco | Dec. 12, 1939 |
| 2,244,703 | Hubbuch | June 10, 1941 |
| 2,367,665 | Capstaff et al. | Jan. 23, 1945 |
| 2,391,181 | Minsk et al. | Dec. 18, 1945 |
| 2,415,442 | Rackett | Feb. 11, 1947 |

FOREIGN PATENTS

| Number | Country | Date |
|---|---|---|
| 537,232 | Great Britain | June 13, 1941 |